(12) United States Patent
Koshi et al.

(10) Patent No.: US 9,044,823 B2
(45) Date of Patent: Jun. 2, 2015

(54) LONG LIGHT METAL BILLET AND METHOD FOR MANUFACTURING THE SAME

(75) Inventors: Akihiko Koshi, Osaka (JP); Jinsun Liao, Osaka (JP)

(73) Assignee: Kurimoto, Ltd., Osaka (JP)

( * ) Notice: Subject to any disclaimer, the term of this patent is extended or adjusted under 35 U.S.C. 154(b) by 166 days.

(21) Appl. No.: 13/812,672

(22) PCT Filed: Jun. 25, 2012

(86) PCT No.: PCT/JP2012/004095
§ 371 (c)(1),
(2), (4) Date: Jan. 28, 2013

(87) PCT Pub. No.: WO2014/002127
PCT Pub. Date: Jan. 3, 2014

(65) Prior Publication Data
US 2014/0234017 A1    Aug. 21, 2014

(51) Int. Cl.
| B23K 20/02 | (2006.01) |
| B32B 15/16 | (2006.01) |
| B22F 3/02  | (2006.01) |
| B22F 7/06  | (2006.01) |
| B22F 3/20  | (2006.01) |

(52) U.S. Cl.
CPC .......... *B23K 20/028* (2013.01); *Y10T 403/478* (2015.01); *B22F 3/02* (2013.01); *B22F 3/20* (2013.01); *B22F 7/062* (2013.01)

(58) Field of Classification Search
None
See application file for complete search history.

(56) References Cited

U.S. PATENT DOCUMENTS

| 2,023,498 | A | * | 12/1935 | Winston | 228/158 |
| 2,050,298 | A | * | 8/1936 | Everett | 139/387 R |
| 2,333,271 | A | * | 11/1943 | Paterson | 419/6 |
| 2,756,492 | A | * | 7/1956 | Pettibone | 419/3 |
| 3,122,828 | A | * | 3/1964 | Havel | 29/423 |
| 3,673,667 | A | * | 7/1972 | Loewenstein et al. | 29/423 |
| 3,788,820 | A | * | 1/1974 | Hunt | 428/586 |
| 3,899,821 | A | * | 8/1975 | Ito et al. | 419/28 |
| 4,040,162 | A | * | 8/1977 | Isogai et al. | 29/403.2 |
| 4,575,450 | A | * | 3/1986 | Meunier | 419/41 |
| 4,628,008 | A | * | 12/1986 | Conolly | 428/548 |
| 4,632,702 | A | * | 12/1986 | DiGiambattista | 75/228 |

(Continued)

FOREIGN PATENT DOCUMENTS

| JP | 6345307 | 2/1988 |
| JP | 3215604 | 9/1991 |

(Continued)

OTHER PUBLICATIONS

Translation of JP 03-215604. 9-1991.*

(Continued)

*Primary Examiner* — John J Zimmerman
(74) *Attorney, Agent, or Firm* — Alston & Bird LLP (57) ABSTRACT

A plurality of short light metal billets obtained by pressing light metal pieces are stacked in a long container having an inside diameter D that is larger than an outside diameter d of each of the short light metal billets, are pressed in the long container at a temperature higher than room temperature, and are compressed until the outside diameter d of each of the short light metal billets becomes equal to the inside diameter D of the long container, thereby joining the short light metal billets together at an interface between each adjacent pair of the short light metal billets by friction.

1 Claim, 8 Drawing Sheets

(56) References Cited

U.S. PATENT DOCUMENTS 4,699,657 A * 10/1987 DiGiambattista ............... 75/228
5,124,214 A * 6/1992 Cacace ........................ 428/577
5,342,575 A    8/1994 Nagai
6,706,416 B1 * 3/2004 Cacace ........................ 428/548

FOREIGN PATENT DOCUMENTS

| JP | 570802 | 3/1993 |
| JP | 657305 | 3/1994 |
| JP | 10296498 | 11/1998 |
| JP | 201024545 | 2/2010 |

OTHER PUBLICATIONS

International Search Report for Application No. PCT/JP2012/004095; dated Sep. 18, 2012.

* cited by examiner

LONG LIGHT METAL BILLET AND METHOD FOR MANUFACTURING THE SAME

TECHNICAL FIELD

The present invention relates to long light metal billets for use in, e.g., extruding, and methods for manufacturing the same.

BACKGROUND ART

It has been conventionally known to manufacture an alloy piece billet by pressing alloy pieces made of a light metal. Out of such methods for manufacturing an alloy piece billet, various manufacturing methods configured to enhance yield have been known.

It has been known that, for example, while an upper punch is brought into contact with pieces with which the interior of a die is filled to confine the pieces, a lower punch is moved relatively upward to the die to press the pieces from below, and subsequently, the upper punch is moved downward to further press the pieces, thereby forming a long green compact.

Furthermore, a method has been known in which, a first alloy billet, alloy pieces, and a second alloy billet are stacked in a die sequentially from bottom to top, the stack in the die is compressed under pressure such that alloy particles enter the first and second alloy billets, thereby producing an integrally formed long alloy billet.

SUMMARY OF THE INVENTION

Technical Problem

However, some conventional manufacturing methods are intended only for long green compacts having a length of 30-80 mm, and consideration is not given to longer green compacts.

Furthermore, in some conventional manufacturing methods, the task in which the alloy pieces are appropriately interposed between the first alloy billet and the second alloy billet is troublesome.

It is therefore an object of the present invention to manufacture a long light metal billet of high quality by a simple method without using light metal pieces.

Solution to the Problem

In order to achieve the above object, in this invention, a plurality of short light metal billets manufactured of light metal pieces are pressed in a long container having a larger inside diameter.

Specifically, a method for manufacturing a long light metal billet according to a first aspect of the invention includes: a preparation step of preparing a plurality of short light metal billets obtained by pressing light metal pieces; a stacking step of stacking the plurality of short light metal billets in a long container having an inside diameter that is larger than an outside diameter of each of the short light metal billets; and a compression step of pressing the plurality of short light metal billets in the long container at a temperature higher than room temperature, compressing the short light metal billets until the outside diameter of each of the short light metal billets becomes equal to the inside diameter of the long container, and joining the short light metal billets together at an interface between each adjacent pair of the short light metal billets by friction.

With the configuration, when the light metal powder is to be pressed, it can be also compressed at room temperature, and the light metal pieces are not used in the long container; thus, a long light metal billet is easily manufactured. Furthermore, since junction between each adjacent pair of the short billets is ensured by friction, a highly marketable long light metal billet which is resistant to handling is obtained.

According to a second aspect of the invention, in the first aspect of the invention, in the compression step, $$e(\delta-15) \times (P/98.06)3 \times e((T-273)/20) > 50$$

may be satisfied where δ represents a compression percentage given by (D−d)/D×100(%), D represents the inside diameter of the long container, d represents the outside diameter of each of the short light metal billets, P represents a contact pressure (MPa), and T represents a temperature (K).

With the configuration, even when the short light metal billets are not compressed at high temperature and high pressure, junction between each adjacent pair of the short light metal billets at the corresponding interface is ensured by selecting an appropriate compression percentage, thereby obtaining a strong long light metal billet which is not broken even with a small shock during transportation.

According to a third aspect of the invention, a plurality of short light metal billets obtained by pressing light metal pieces are stacked in a long container having an inside diameter that is larger than an outside diameter of each of the short light metal billets, are pressed in the long container at a temperature higher than room temperature, and are compressed until the outside diameter of each of the short light metal billets becomes equal to the inside diameter of the long container, thereby joining the short light metal billets together at an interface between each adjacent pair of the short light metal billets by friction.

With the configuration, when the light metal powder is to be pressed, it can be also compressed at room temperature, and the light metal pieces are not used in the long container; thus, a long light metal billet is easily manufactured. Furthermore, since junction between each adjacent pair of the short billets is ensured by friction, a highly marketable long light metal billet which is resistant to handling is obtained.

Advantages of the Invention

As described above, according to the present invention, a plurality of short light metal billets are pressed in a long container at a temperature higher than room temperature, and are compressed until the outside diameter of each of the short light metal billets becomes equal to the inside diameter of the long container, and thus, the short light metal billets are joined together at the interface between each adjacent pair of the short light metal billets by friction; therefore, a long light metal billet of high quality can be manufactured by a simple method without using light metal pieces.

BRIEF DESCRIPTION OF THE DRAWINGS

Having thus described the invention in general terms, reference will now be made to the accompanying drawings, which are not necessarily drawn to scale, and wherein:

DESCRIPTION OF EMBODIMENTS

An embodiment of the present invention will be described hereinafter with reference to the drawings.

Figure 1:
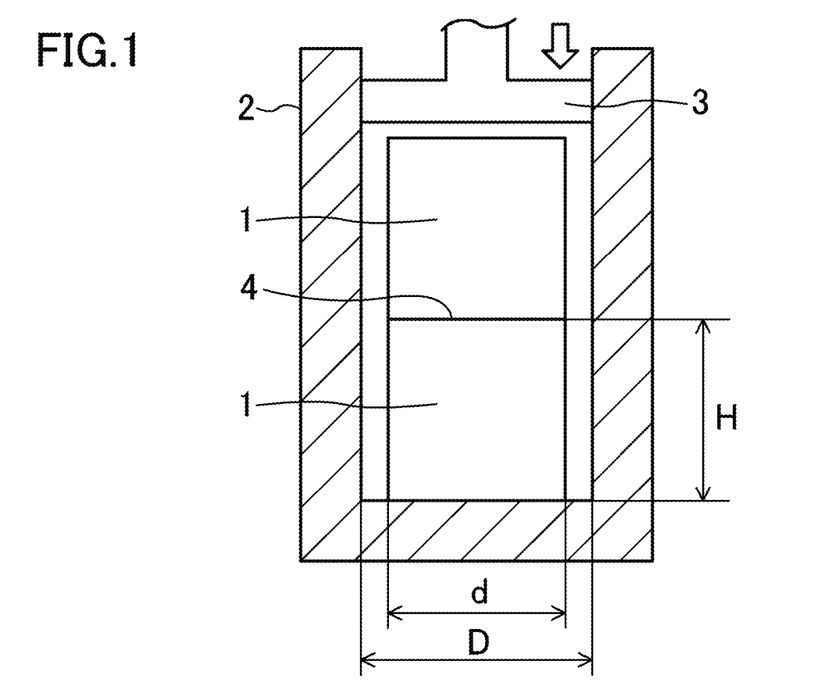
FIG. 1 is a diagram illustrating a compression step in a method for manufacturing a long light metal billet.
Figure 2:
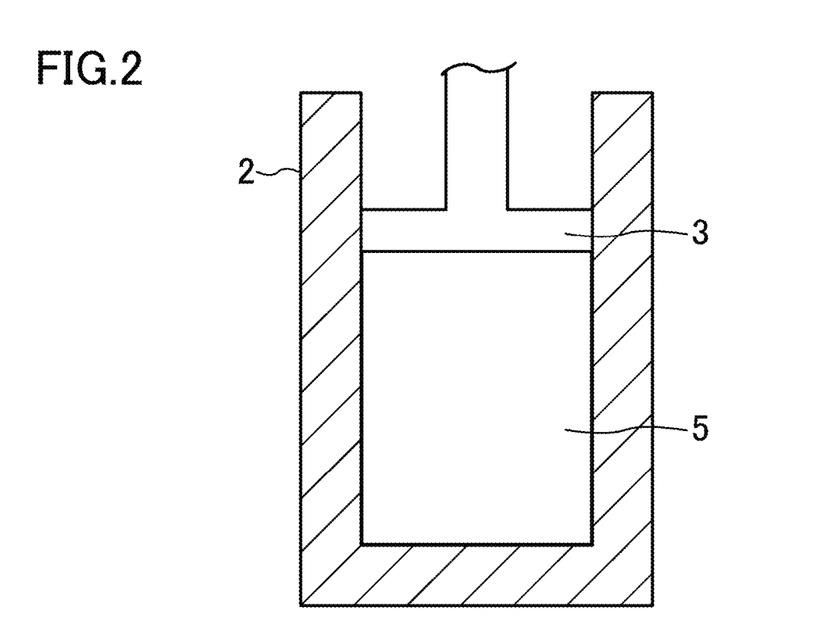
FIG. 2 is a diagram corresponding to FIG. 1 at the completion of the compression step.
Figure 3:
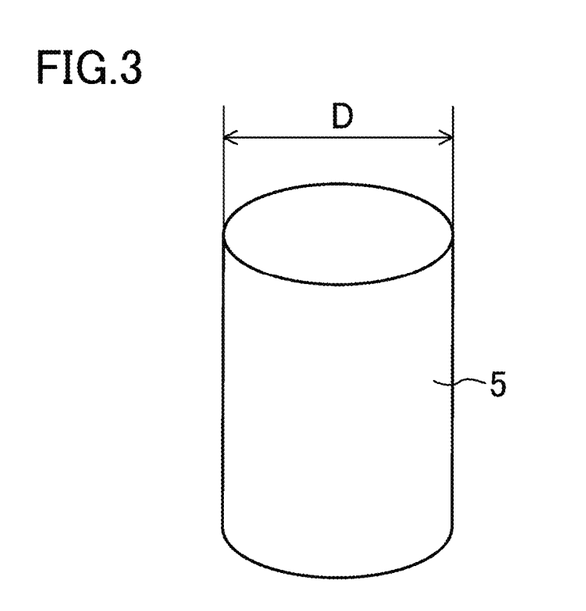
FIG. 3 is a perspective view illustrating a long light metal billet after the compression step.
Figure 4:
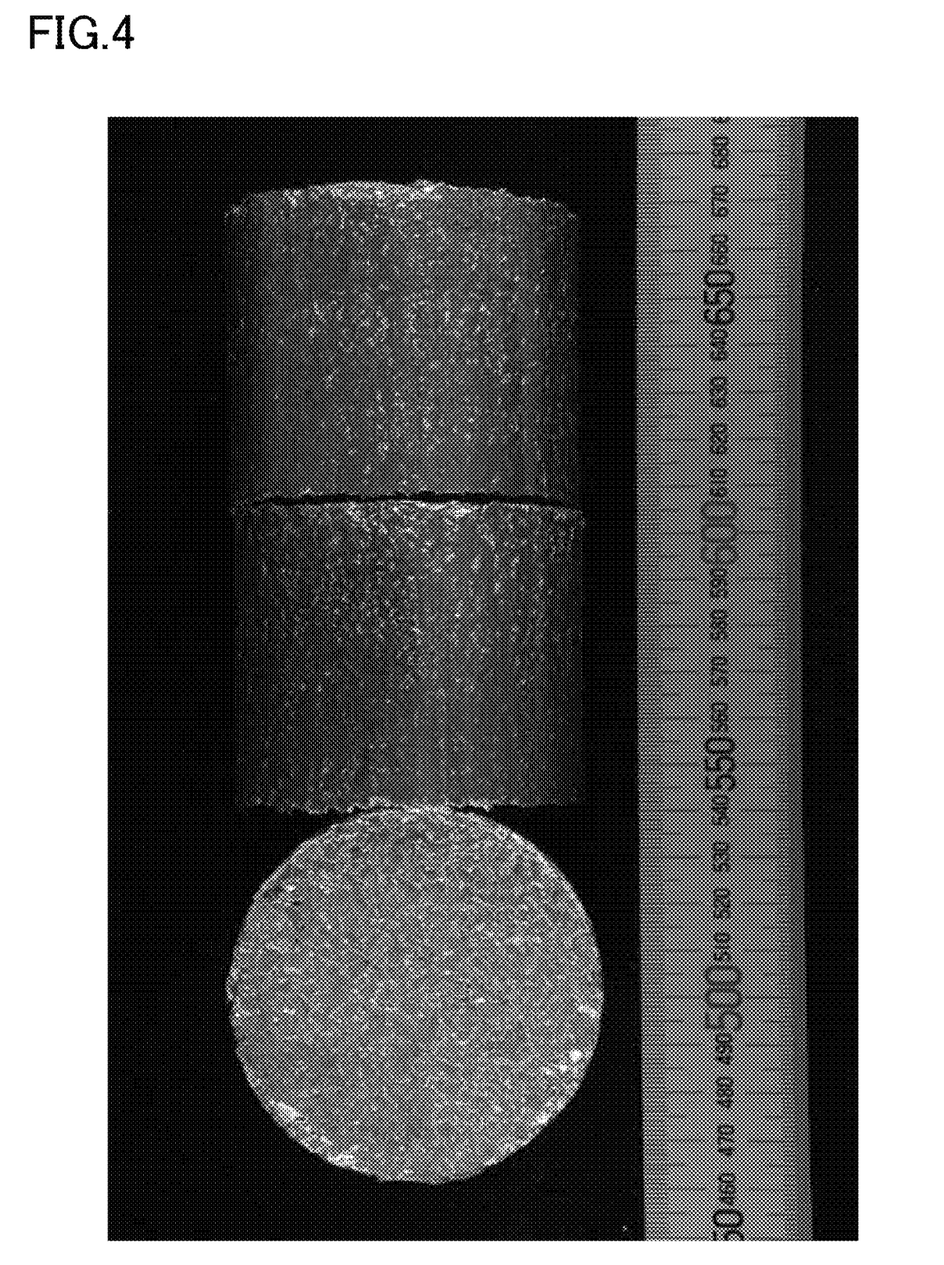
FIG. 4 is a photograph illustrating short light metal billets.

FIGS. 1-3 are cross-sectional views illustrating a method for manufacturing a long light metal billet 5 according to the embodiment of the present invention. Although not shown in detail, in a preparation step, light metal pieces made of a flat magnesium alloy plate having, e.g., a length of several millimeters is first inserted into each of short billets, and a plurality of short light metal billets 1 formed, e.g., by compressing the light metal pieces at room temperature are prepared. In this case, the contact pressure may be low to the extent that, as illustrated in FIG. 4, the light metal pieces are not completely compressed, and has a proper number of internal cavities. Since the short light metal billets 1 are compressed at a certain contact pressure, the height H of each of the short light metal billets 1 varies depending on the outside diameter of the short light metal billet 1, which is represented by d, and the amount of the pieces used, and for example, the value H/d is about 0.5-1.25. When the short light metal billets 1 are to be formed, they can be also compressed at room temperature; thus, a simple facility is merely required, and the short light metal billets 1 are easily manufactured.

Next, in a preheating step, the short light metal billets 1 are preheated to an appropriate temperature. This preheating step is not always required.

Next, in a stacking step, the plurality of short light metal billets 1 are stacked in a long container 2 having an inside diameter D that is larger than the outside diameter d of each of the short light metal billets 1. The number of the short light metal billets 1 may be any number greater than or equal to two. The long container 2 includes an unshown heating unit, such as a heater, and can keep an appropriate temperature T (K). An oxide film is formed at an interface 4 between each adjacent pair of the short light metal billets 1 before being pressed, and thus, the interface 4 can be visually identified.

Next, in a compression step, the plurality of short light metal billets 1 are pressed from above an upper surface of the uppermost short light metal billet 1 in the long container 2 at the temperature T higher than room temperature by a piston 3, and are compressed until the contact pressure reaches a predetermined contact pressure. In this case, it is preferable to satisfy the following expression (1):

[Expression 1]

$$e^{(\delta-15)} \times \left(\frac{P}{98.06}\right)^3 \times e^{\left(\frac{T-273}{20}\right)} > 50 \quad (1)$$

where the compression percentage δ is given by (D−d)/D× 100(%), D represents the inside diameter of the long container 2 (the outside diameter of the long light metal billet 5), d represents the outside diameter of each of the short light metal billets 1, P represents the contact pressure (MPa), and T represents the temperature (K).

Figure 5:
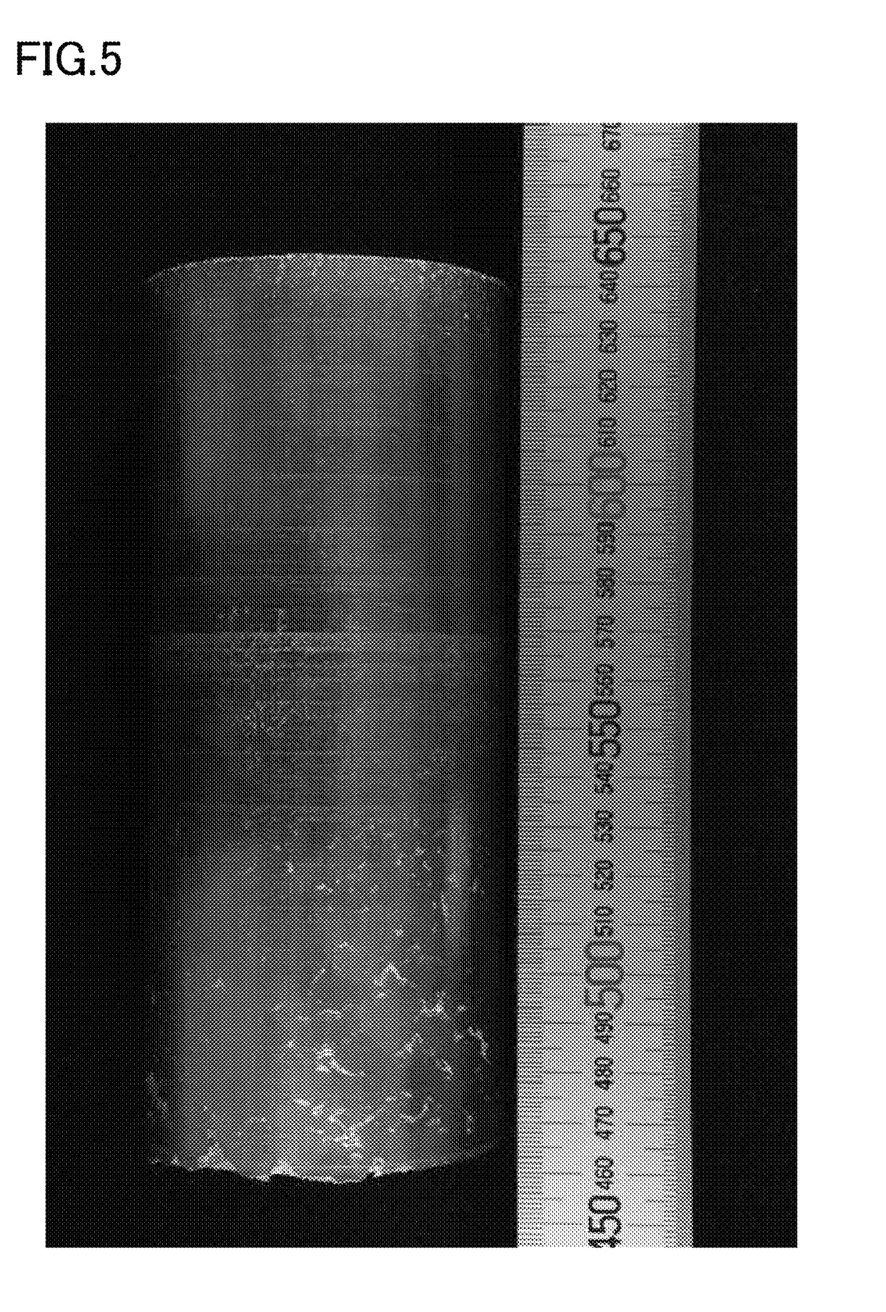
FIG. 5 is a photograph illustrating a long light metal billet.
Figure 6:
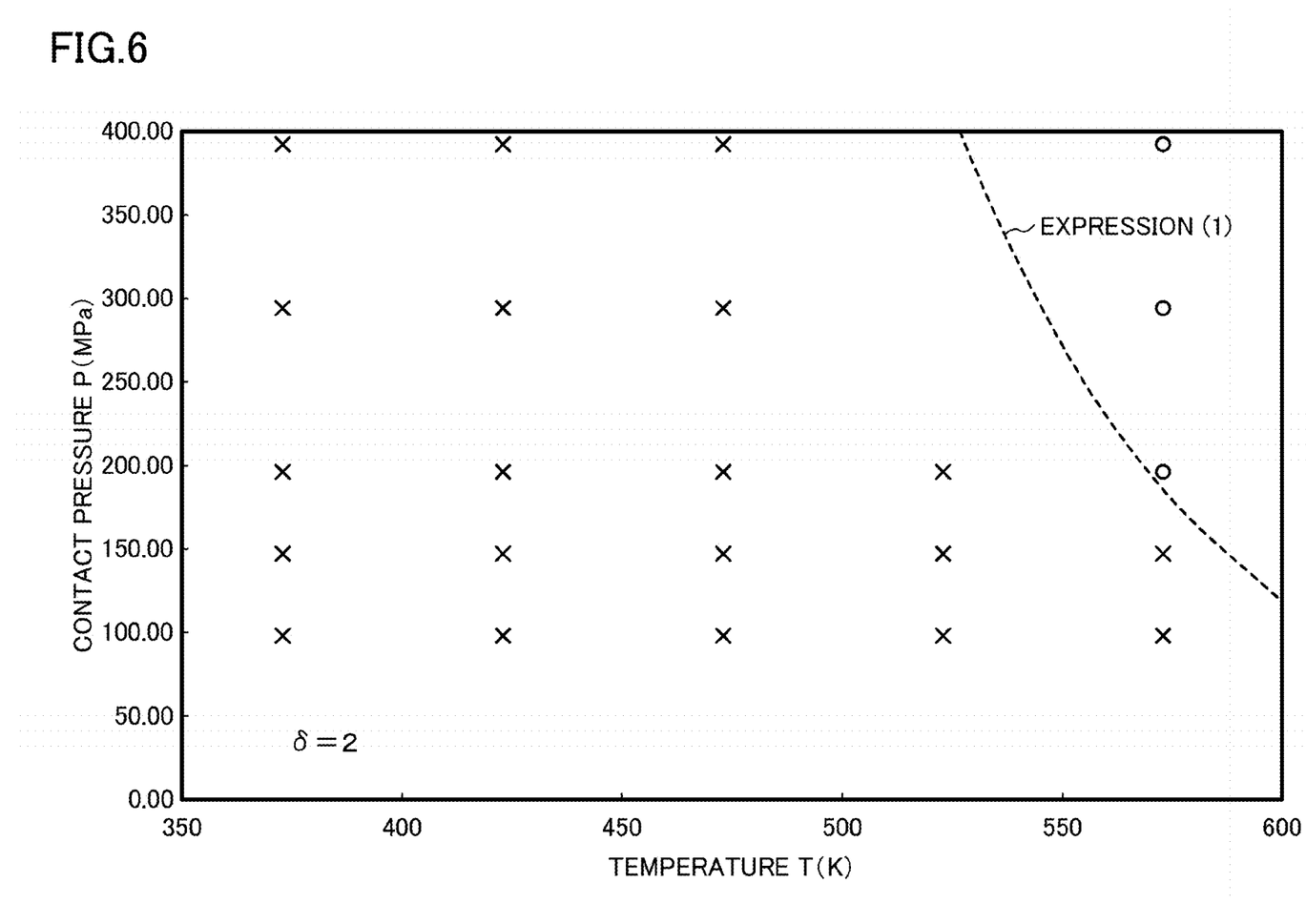
FIG. 6 is a graph illustrating test results at a compression percentage of 2%.
Figure 7:
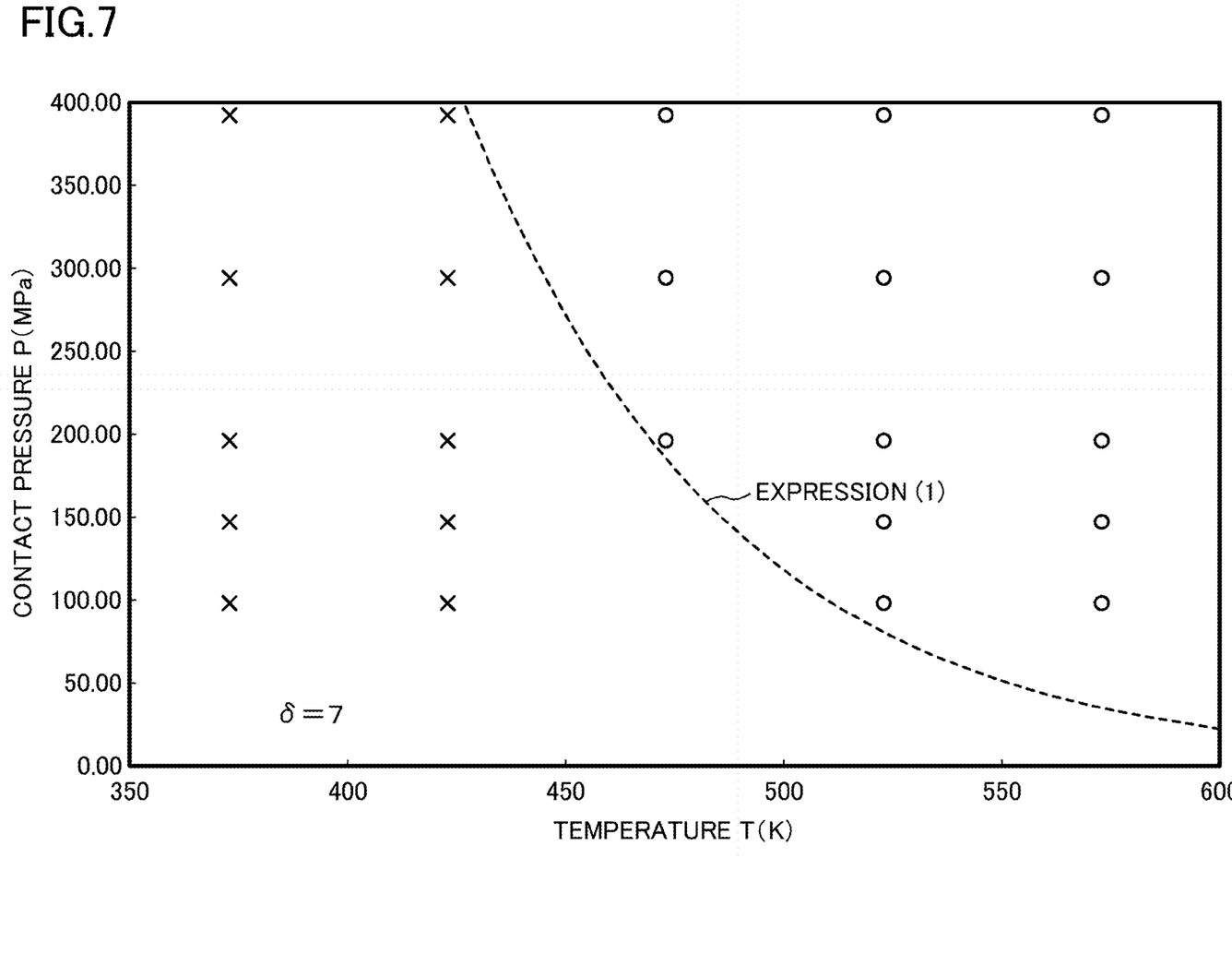
FIG. 7 is a graph illustrating test results at a compression percentage of 7%.
Figure 8:
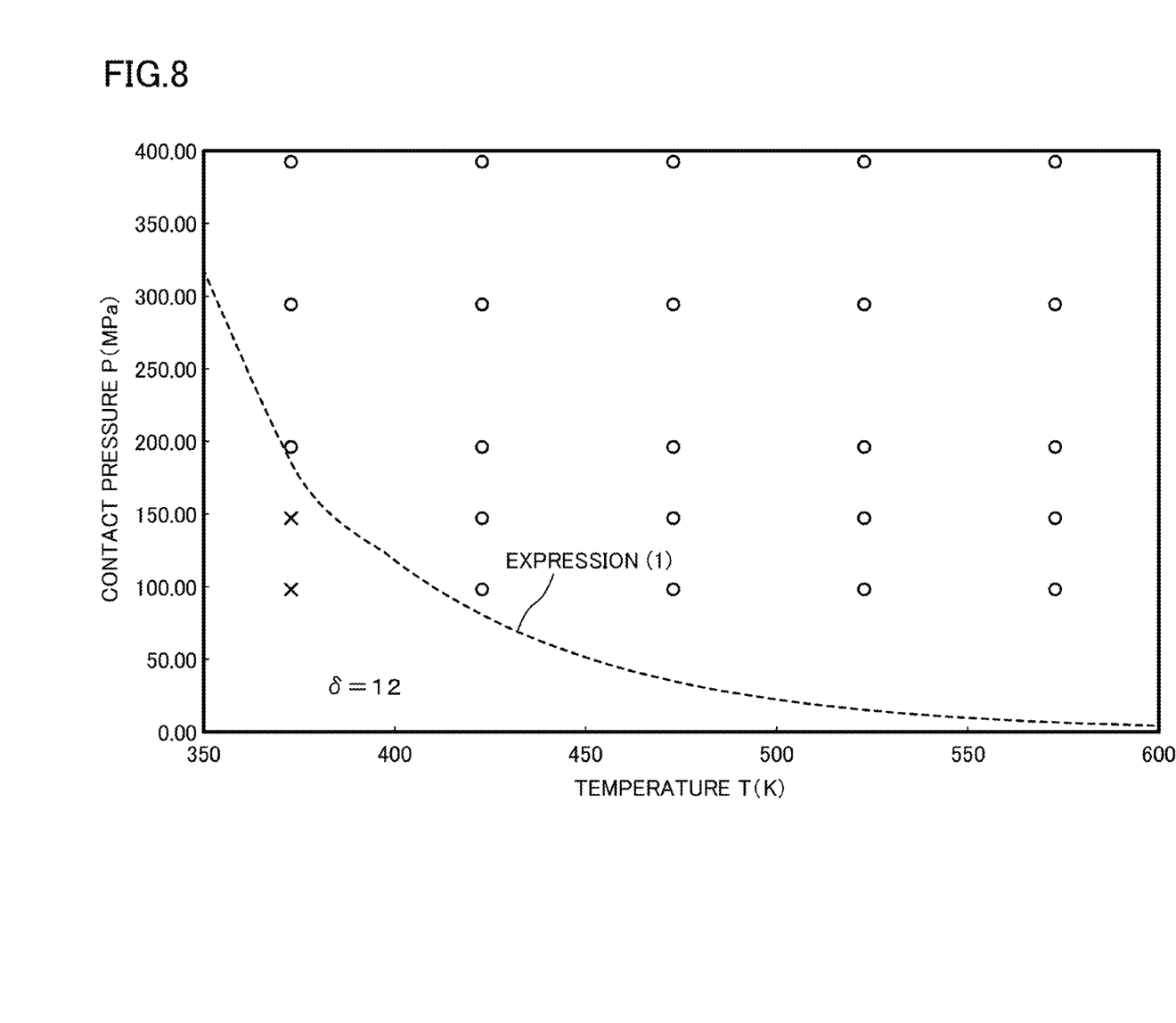
FIG. 8 is a graph illustrating test results at a compression percentage of 12%.
Figure 9:
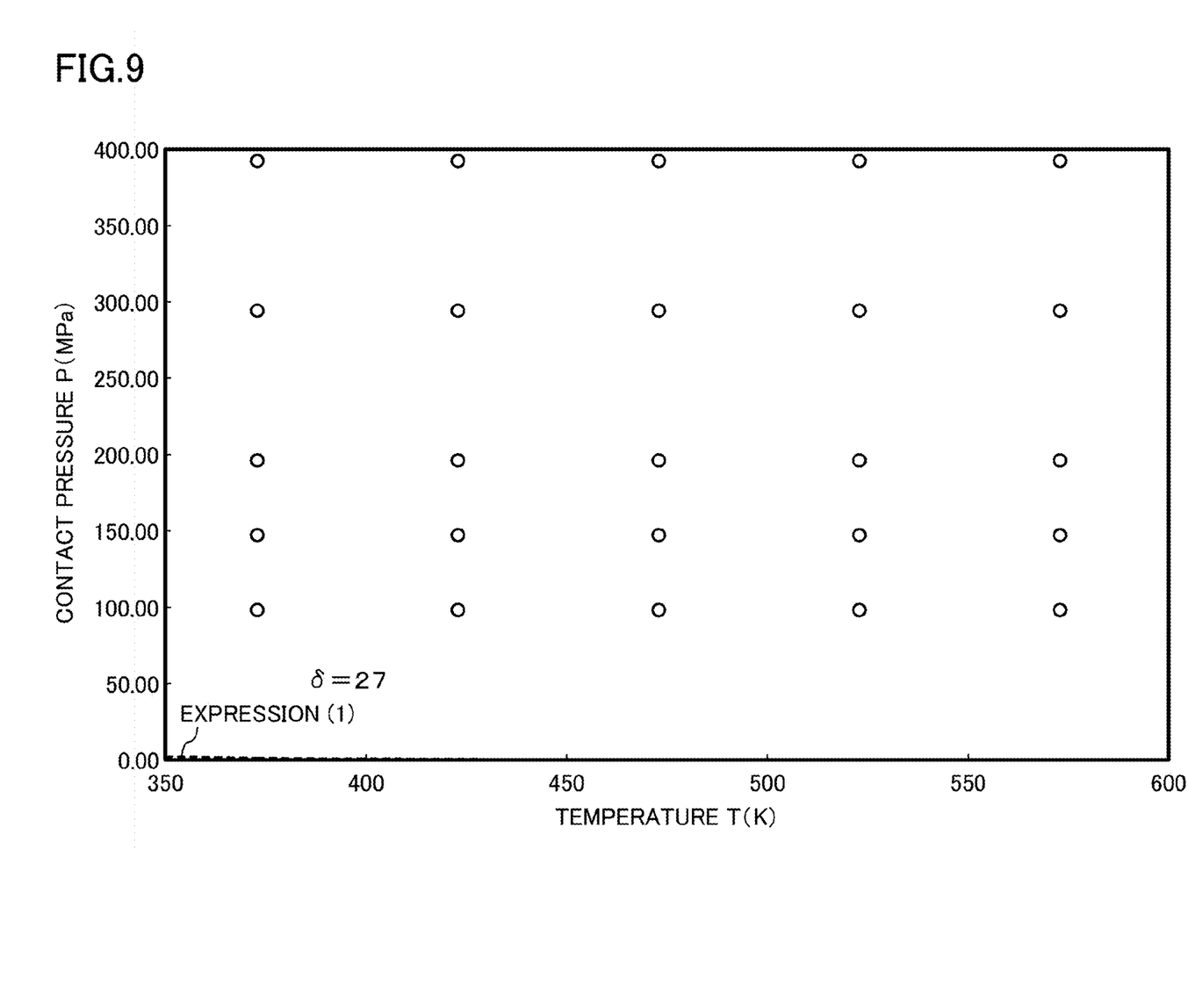
FIG. 9 is a graph illustrating test results at a compression percentage of 27%.

When the compression step is performed under conditions satisfying the expression, the short light metal billets 1 are joined together at the interface 4 between each adjacent pair of the short light metal billets 1 by friction, and are bonded together to the extent that the interface 4 cannot be visually identified as illustrated in FIG. 5, thereby obtaining a strong long light metal billet 5.

As such, light metal pieces do not need to be inserted into the long container 2, and the long light metal billet 5 is very easily manufactured.

—Drop Test—

Next, a destructive test of a long light metal billet 5 manufactured by the manufacturing method was carried out.

In the test, it was assumed that the long light metal billet 5 dropped during handling for the transportation of the long light metal billet 5, and the long light metal billet 5 was kept in a horizontal position, and was freely dropped from a height of 40 cm to determine whether or not the long light metal billet 5 was broken.

In the manufacturing method, test specimens of long light metal billets 5 were prepared at different compressibilities δ (%), different temperatures T (K), and different contact pressures P (MPa), and were tested.

FIGS. 6-9 illustrate test results. The symbol ○ represents that the corresponding specimen was not broken even when being dropped from a height of 40 cm, and is resistant to a drop during handling. The symbol x represents that the corresponding specimen was broken when being dropped from a height of 40 cm, and thus, is not resistant to a drop during handling.

Test results at different compressibilities δ in FIGS. 6-9 showed that the compression percentage δ (%), the temperature T (K), and the contact pressure P (MPa) may be selected to satisfy the expression (1), and further showed that as the compression percentage δ increases, the strength of the long light metal billet 5 can be ensured even at low temperature and low pressure. As such, even when the short light metal billets 1 are not compressed at high temperature and high pressure, junction between each adjacent pair of the short light metal billets 1 at the corresponding interface 4 is ensured by selecting an appropriate compression percentage, thereby obtaining a strong long light metal billet 5 which is not broken with a small shock during transportation.

Therefore, according to the long light metal billet 5 of this embodiment and the method for manufacturing the same, the plurality of short light metal billets 1 are pressed in the long container 2 at a temperature higher than room temperature, are compressed until the outside diameter of each of the short light metal billets 1 becomes equal to the inside diameter D of the long container 2, and are thus joined together at the interface 4 by friction, thereby manufacturing a long light metal billet 5 of high quality by a simple method without using light metal pieces.

Other Embodiments

The embodiment of the present invention may be configured as follows.

Specifically, although, in the embodiment, the short light metal billet 1 is formed from light metal pieces made of a flat magnesium alloy plate having, e.g., a length of several millimeters, a material of the short light metal billet 1 is not limited to the above material, and the short light metal billet 1 may be formed from light metal pieces made of, e.g., magnesium, aluminum, an aluminum alloy, titanium, or a titanium alloy.

The foregoing embodiments are merely preferred examples in nature, and are not intended to limit the scope, applications, and use of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

INDUSTRIAL APPLICABILITY

As described above, the present invention is useful for long light metal billets of light metal, such as a magnesium alloy, for use in, e.g., extruding, and methods for manufacturing the same.

The invention claimed is:

1. A method for manufacturing a long light metal billet, the method comprising:
   a preparation step of preparing a plurality of short light metal billets obtained by compressing light metal pieces;
   a stacking step of stacking the plurality of short light metal billets in a long container having an inside diameter that is larger than an outside diameter of each of the short light metal billets; and
   a compression step of pressing the plurality of short light metal billets in the long container at a temperature higher than room temperature, compressing the short light metal billets until the outside diameter of each of the short light metal billets becomes equal to the inside diameter of the long container, and joining the short light metal billets together at an interface between each adjacent pair of the short light metal billets by friction,
   wherein in the compression step, $$e^{(\delta-15)} \times (P/98.06)^3 \times e^{((T-273)/20)} > 50$$

is satisfied where
      δ represents a compression percentage given by $(D-d)/D \times 100(\%)$,
      D represents the inside diameter of the long container,
      d represents the outside diameter of each of the short light metal billets,
      P represents a contact pressure (MPa), and
      T represents a temperature (K).

* * * * *